US010445953B1

United States Patent
Herron et al.

(10) Patent No.: US 10,445,953 B1
(45) Date of Patent: *Oct. 15, 2019

(54) VEHICLE PROGRAMMING AND DIAGNOSTIC DEVICE WITH INTEGRATED BATTERY CHARGER

(71) Applicant: Drew Technologies, Inc., Ann Arbor, MI (US)

(72) Inventors: Brian J. Herron, Dexter, MI (US); Michael L. Drew, Dexter, MI (US); Bert Steck, Ann Arbor, MI (US); David Baartman, Canton, MI (US)

(73) Assignee: Drew Technologies, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/485,531

(22) Filed: Apr. 12, 2017

(51) Int. Cl.
*G07C 5/08* (2006.01)
*H02J 7/00* (2006.01)
*G07C 5/00* (2006.01)
*B60R 16/02* (2006.01)

(52) U.S. Cl.
CPC ............ *G07C 5/0808* (2013.01); *B60R 16/02* (2013.01); *G07C 5/008* (2013.01); *H02J 7/0045* (2013.01); *H02J 7/0052* (2013.01)

(58) Field of Classification Search
CPC ...... G07C 5/0808; G07C 5/008; B60R 16/02; H02J 7/0045; H02J 7/0052
See application file for complete search history.

(56) References Cited

U.S. PATENT DOCUMENTS

| 3,829,332 A | * | 8/1974 | Tonooka et al. | ..... H01M 2/1022 429/97 |
| 4,160,857 A | * | 7/1979 | Nardella | ............... H01M 2/105 429/97 |

(Continued)

OTHER PUBLICATIONS

Commonly assigned co-pending U.S. Appl. No. 15/446,744, filed Mar. 1, 2017, entitled Remote Diagnostic System and Method, 26 pages.

(Continued)

*Primary Examiner* — Behrang Badii
*Assistant Examiner* — Daniel L Greene
(74) *Attorney, Agent, or Firm* — Gardner, Linn, Burkhart & Ondersma LLP

(57) ABSTRACT

A vehicle computer service device for programming and/or diagnosing a vehicle computer system includes a case defining an internal compartment, with a battery charger and a control retained within the compartment. The control includes a controller and a computer having a display with the computer being operably connected with the controller and the controller configured to be operatively connected with the OBD port of a vehicle to reprogram computer control modules of the vehicle. The control may detect when the battery charger is connected to a vehicle battery and be configured to be inoperable to reprogram a computer control module of a vehicle when the control is unconnected to a vehicle battery. A pair of posts extend from the case, where cables may be attached to the posts and the terminals of a battery of a vehicle that is being reprogrammed to ensure the vehicle is powered during a reprogramming operation.

22 Claims, 8 Drawing Sheets

(56) References Cited

U.S. PATENT DOCUMENTS

| | | | |
|---|---|---|---|
| 4,580,004 A * | 4/1986 | Beneteau | H01F 27/02 |
| | | | 174/559 |
| 5,491,418 A | 2/1996 | Alfaro et al. | |
| 5,592,528 A * | 1/1997 | Nelson | H02J 7/0045 |
| | | | 324/538 |
| 5,939,858 A * | 8/1999 | Dodd | H02J 7/0042 |
| | | | 180/68.5 |
| D468,261 S * | 1/2003 | Peng | D13/119 |
| 6,577,098 B2 * | 6/2003 | Griffey | H02J 7/0042 |
| | | | 320/103 |
| 6,728,603 B2 | 4/2004 | Pruzan et al. | |
| 6,818,860 B1 * | 11/2004 | Stava | B23K 9/1006 |
| | | | 219/130.1 |
| 6,928,349 B1 | 8/2005 | Namaky et al. | |
| 6,956,501 B2 | 10/2005 | Kitson | |
| 7,092,803 B2 | 8/2006 | Kapolka et al. | |
| 7,519,458 B2 | 4/2009 | Buckley | |
| 7,532,962 B1 | 5/2009 | Lowrey et al. | |
| 7,584,030 B1 | 9/2009 | Graham | |
| 7,786,851 B2 | 8/2010 | Drew et al. | |
| 7,928,837 B2 | 4/2011 | Drew et al. | |
| 8,190,322 B2 | 5/2012 | Lin et al. | |
| 8,339,254 B2 | 12/2012 | Drew et al. | |
| D675,568 S | 2/2013 | Drew et al. | |
| 8,638,207 B2 | 1/2014 | Drew et al. | |
| D701,832 S | 4/2014 | Drew et al. | |
| 8,688,313 B2 | 4/2014 | Margol et al. | |
| D718,201 S | 11/2014 | Drew et al. | |
| D725,519 S | 3/2015 | Drew et al. | |
| 9,530,255 B2 | 12/2016 | Drew et al. | |
| 2003/0236601 A1 * | 12/2003 | McLeod | G07C 5/008 |
| | | | 701/31.4 |
| 2004/0054503 A1 * | 3/2004 | Namaky | G01R 31/007 |
| | | | 702/183 |
| 2005/0040788 A1 * | 2/2005 | Tseng | H02J 7/0027 |
| | | | 320/111 |
| 2005/0251304 A1 | 11/2005 | Cancellara et al. | |
| 2006/0202862 A1 | 9/2006 | Ratnakar | |
| 2006/0211446 A1 | 9/2006 | Wittmann et al. | |
| 2006/0217855 A1 | 9/2006 | Chinnadurai et al. | |
| 2007/0043488 A1 | 2/2007 | Avery et al. | |
| 2007/0050105 A1 | 3/2007 | Chinnadurai et al. | |
| 2007/0185624 A1 | 8/2007 | Duddles et al. | |
| 2007/0198148 A1 * | 8/2007 | Namaky | H04L 67/125 |
| | | | 701/32.8 |
| 2008/0280602 A1 | 11/2008 | Ban | |
| 2008/0315830 A1 * | 12/2008 | Bertness | G01R 31/3648 |
| | | | 320/104 |
| 2009/0119657 A1 | 5/2009 | Link, II | |
| 2009/0265055 A1 | 10/2009 | Gillies | |
| 2010/0285490 A1 * | 11/2010 | Dees | G01N 33/54373 |
| | | | 435/7.1 |
| 2010/0315089 A1 * | 12/2010 | Rapich | H02J 7/0047 |
| | | | 324/426 |
| 2011/0153150 A1 | 6/2011 | Drew et al. | |
| 2011/0300416 A1 * | 12/2011 | Bertness | B60L 3/0046 |
| | | | 429/49 |
| 2011/0313593 A1 | 12/2011 | Cohen et al. | |
| 2012/0038213 A1 * | 2/2012 | Vogel | H02J 9/061 |
| | | | 307/64 |
| 2012/0046826 A1 | 2/2012 | Panko | |
| 2014/0086242 A1 | 3/2014 | Drew et al. | |
| 2014/0121894 A1 | 5/2014 | Drew et al. | |
| 2014/0121937 A1 | 5/2014 | Drew et al. | |
| 2014/0171758 A1 * | 6/2014 | Ayanruoh | A61B 13/00 |
| | | | 600/301 |
| 2014/0172230 A1 | 6/2014 | Drew et al. | |
| 2014/0297099 A1 | 10/2014 | Drew et al. | |
| 2014/0309905 A1 | 10/2014 | Drew et al. | |
| 2017/0172397 A1 | 6/2017 | Zardini | |

OTHER PUBLICATIONS

Commonly assigned co-pending U.S. Appl. No. 15/651,351, filed Jul. 17, 2017, entitled Vehicle Diagnostic and Programming Device and Method, 21 pages.

Commonly assigned co-pending U.S. Appl. No. 15/485,643, filed Apr. 12, 2017, entitled Battery Charger With Projecting Members, 17 pages.

Commonly assigned co-pending U.S. Appl. No. 29/600,447, filed Apr. 12, 2017, entitled Vehicle Diagnostic Device, 14 pages.

* cited by examiner

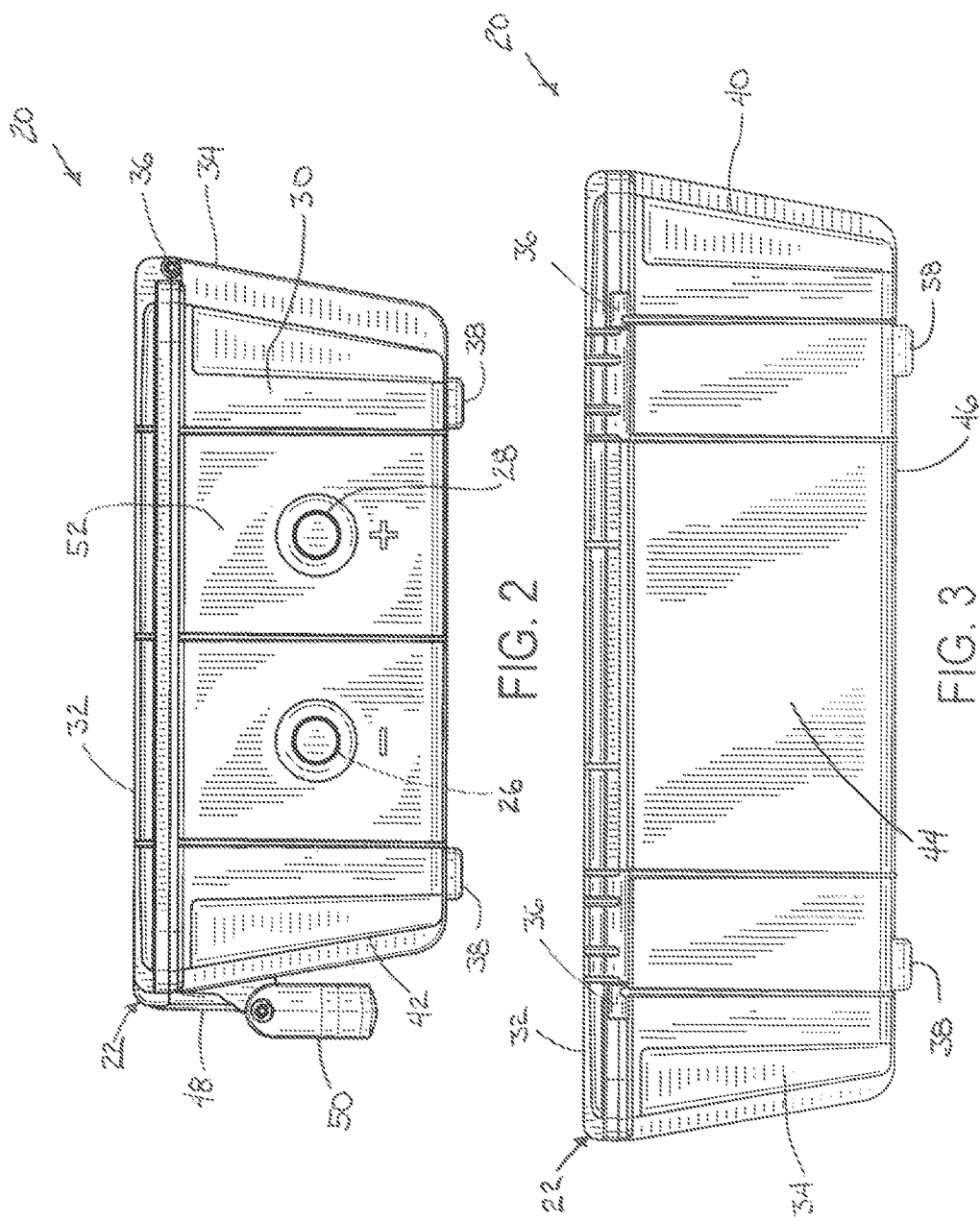

VEHICLE PROGRAMMING AND DIAGNOSTIC DEVICE WITH INTEGRATED BATTERY CHARGER

BACKGROUND OF THE INVENTION

The present invention is directed to a programming and diagnostic device for servicing vehicles, and in particular to such a device with an integrated battery charger.

Modern vehicles are equipped with engine control units ("ECUs") that operate in connection with various computer control modules that are involved in electronic control and/or monitoring of various vehicle functions, with these control modules also being referred to simply as "modules". Occasionally these modules must be reprogrammed, including after the vehicle has been produced and been in service. Reprogramming of vehicle control modules is referred to as "reflashing" and is performed via a data link connector ("DLC") of the vehicle that is connected and accessible via an onboard diagnostic ("OBD") port of the vehicle, such as may be located under the dashboard. Reflashing is typically performed when a vehicle is not running. If power to the ECUs is lost, or drops below a certain level, the ECU will stop accepting commands during the reflashing process, in which case the reflashing will be unsuccessful, and in some instances can be detrimental to the operation of the ECU.

SUMMARY OF THE INVENTION

The present invention provides a vehicle programming and diagnostic device, and in particular a vehicle programming device with an integrated battery charger to provide a vehicle with sufficient power during a reprogramming event.

According to an aspect of the present invention, a vehicle computer service device for programming and/or diagnosing a vehicle computer system in accordance with an embodiment of the present invention includes a case defining an internal compartment, with a battery charger and a control retained within the compartment. The control includes a controller and a computer having a display with the computer being operably connected with the controller and the controller configured to be connected with the on-board diagnostics ("OBD") port of a vehicle to reprogram computer control modules of the vehicle.

In accordance with particular aspects, the control may detect when the battery charger is connected to a vehicle battery and be configured to be inoperable to reprogram a computer control module of a vehicle when the control is unconnected to a vehicle battery to ensure the vehicle is powered during a reprogramming operation. The computer maybe operatively connected with an Internet, such as for downloading files for reprogramming of the vehicle.

In accordance with a particular embodiment a pair of posts extend from the case, where cables may be attached to the posts and the terminals of a battery of a vehicle that is being reprogrammed, with the case including a base and a lid. An insert is positioned within the compartment of the case, with the computer being mounted to the insert such that the display is exposed and visible when the lid is opened, with the battery charger being positioned beneath the insert. The insert may further include receptacles for storing a power cord and a vehicle interface cable, with the power cord being connected to the battery charger and the vehicle interface cable configured to being plugged into an OBD port of a vehicle. The case further includes a handle for ease of transport.

In a particular embodiment, the service device is configured as a remote diagnostic system, with the computer of the device communicating via an Internet connection with a remote technician for performing vehicle diagnostics and/or reprogramming. The computer includes a remote diagnostic program that is operable via the Internet in connection with a diagnostic program on a remotely located computer to enable a remotely located technician to perform service on a vehicle, including reprogramming and diagnostic service.

The programming and diagnostic device of the present invention enables vehicle service to be conducted, including reflashing and diagnostic downloading and monitoring, with the vehicle connected to the battery charger of the device. The programming and diagnostic device may be further configured whereby the control of the device detects when the battery charger is connected to a vehicle battery, and may further be configured to be inoperable to reprogram a computer control module of a vehicle when the control is unconnected to a vehicle battery to ensure the vehicle is powered during a reprogramming operation. Confirmation that the battery charger is connected to the vehicle battery prior to initiating reflashing beneficially inhibits a vehicle battery from depleting below a threshold charge level required for reflashing of the vehicle, and thereby inhibits the vehicle from terminating acceptance of the reprogramming commands, which could lead damage of the vehicle computer system.

These and other objects, advantages, purposes and features of this invention will become apparent upon review of the following specification in conjunction with the drawings.

BRIEF DESCRIPTION OF THE DRAWINGS

FIG. 2 is a right side elevation view of the device of FIG. 1;

FIG. 3 is a back view of the device of FIG. 1;

DESCRIPTION OF THE PREFERRED EMBODIMENTS

Figure 1:
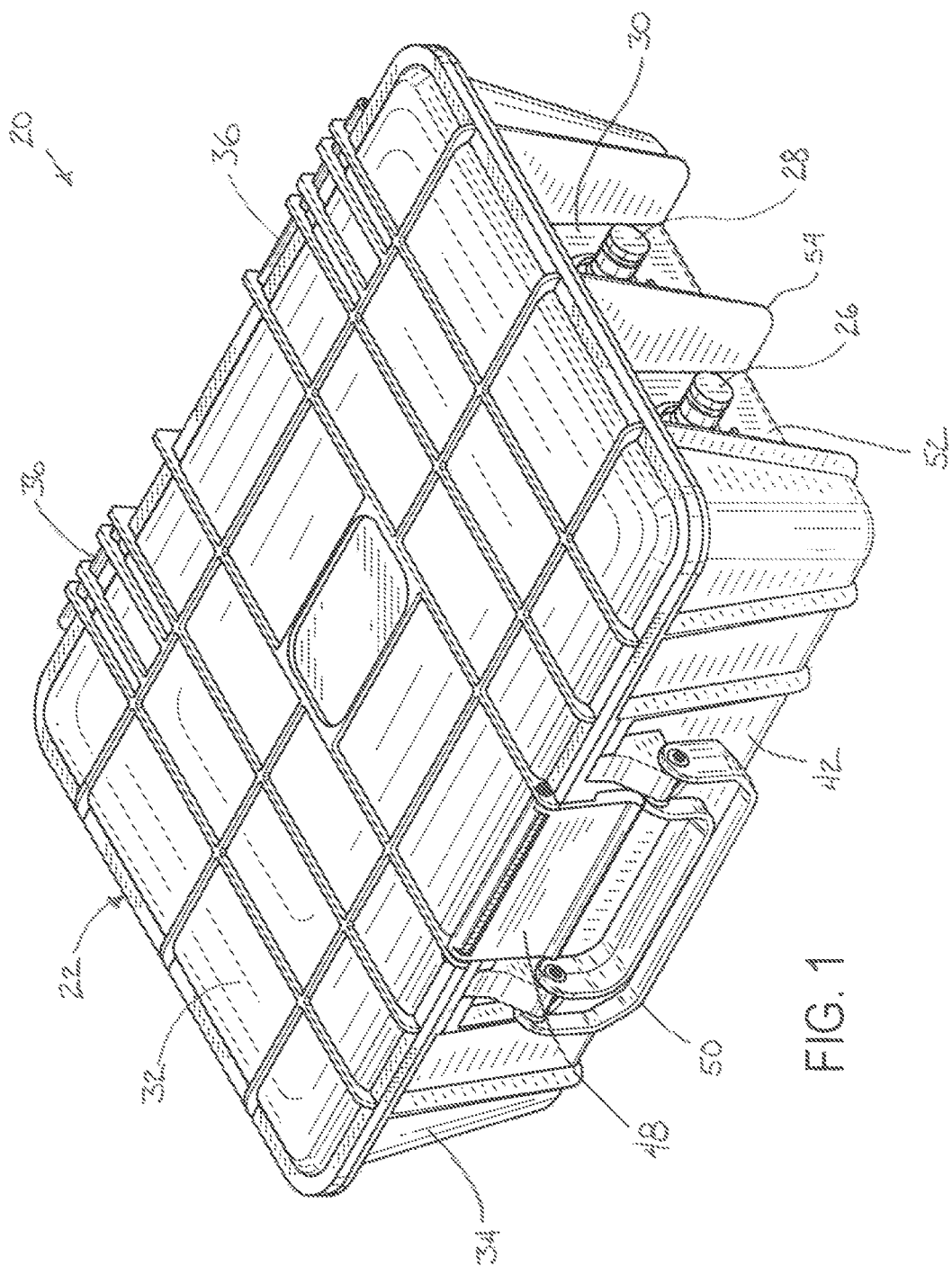
FIG. 1 is a front side isometric view of a vehicle computer service device in accordance with the present invention.
Figure 1A:
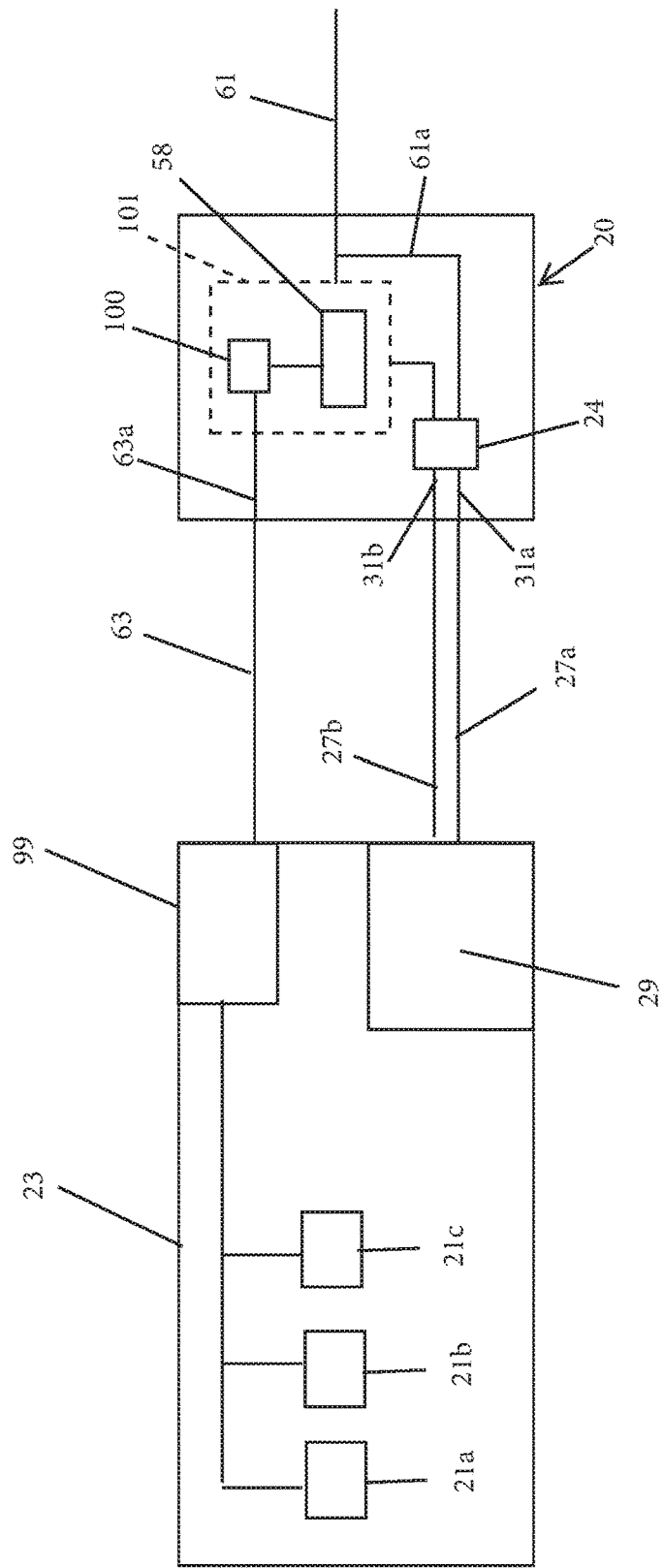
FIG. 1A is a schematic illustration of the device of FIG. 1 connected with a vehicle for reprogramming of vehicle computer control modules.
Figure 4:
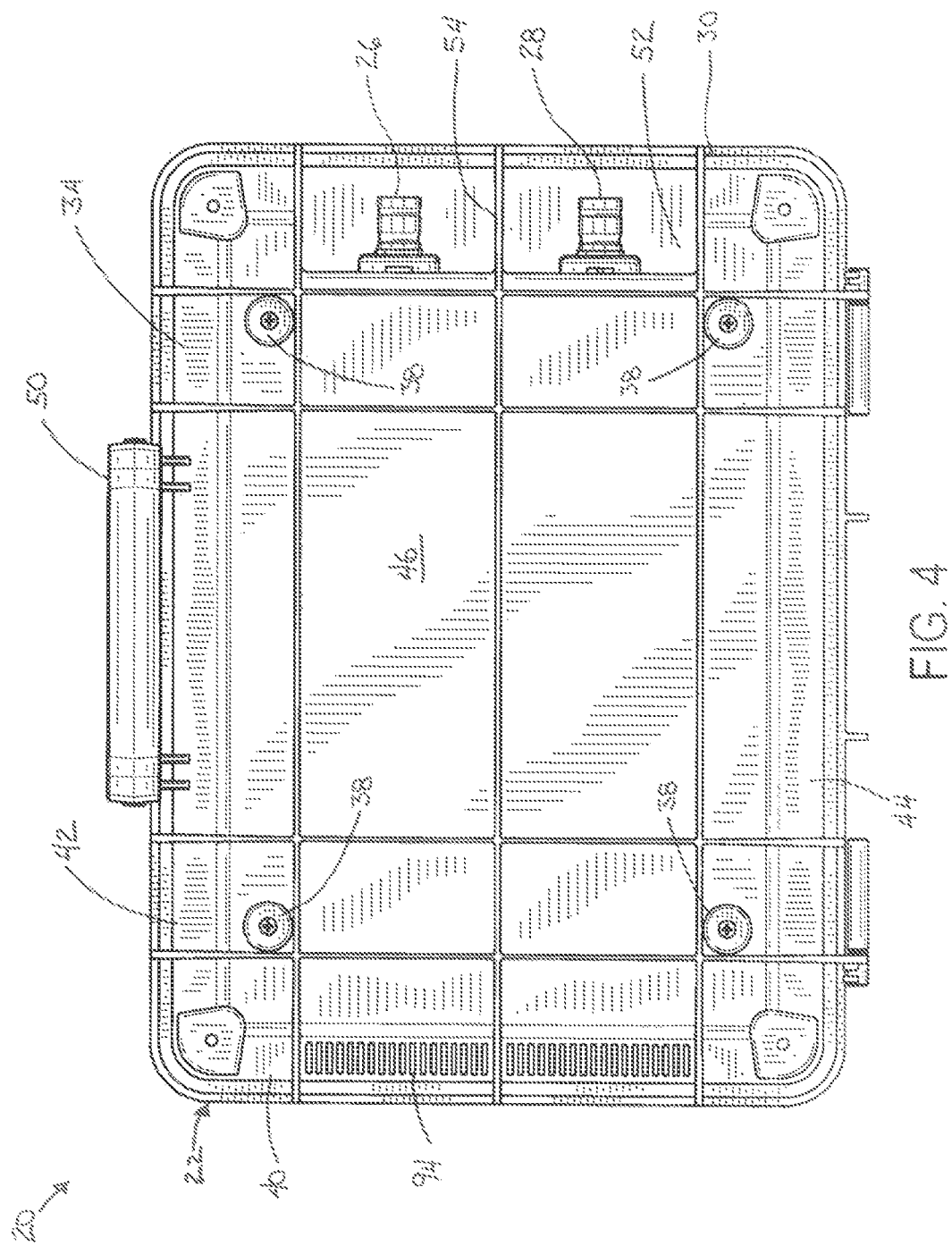
FIG. 4 is a bottom view of the device of FIG. 1.
Figure 5:
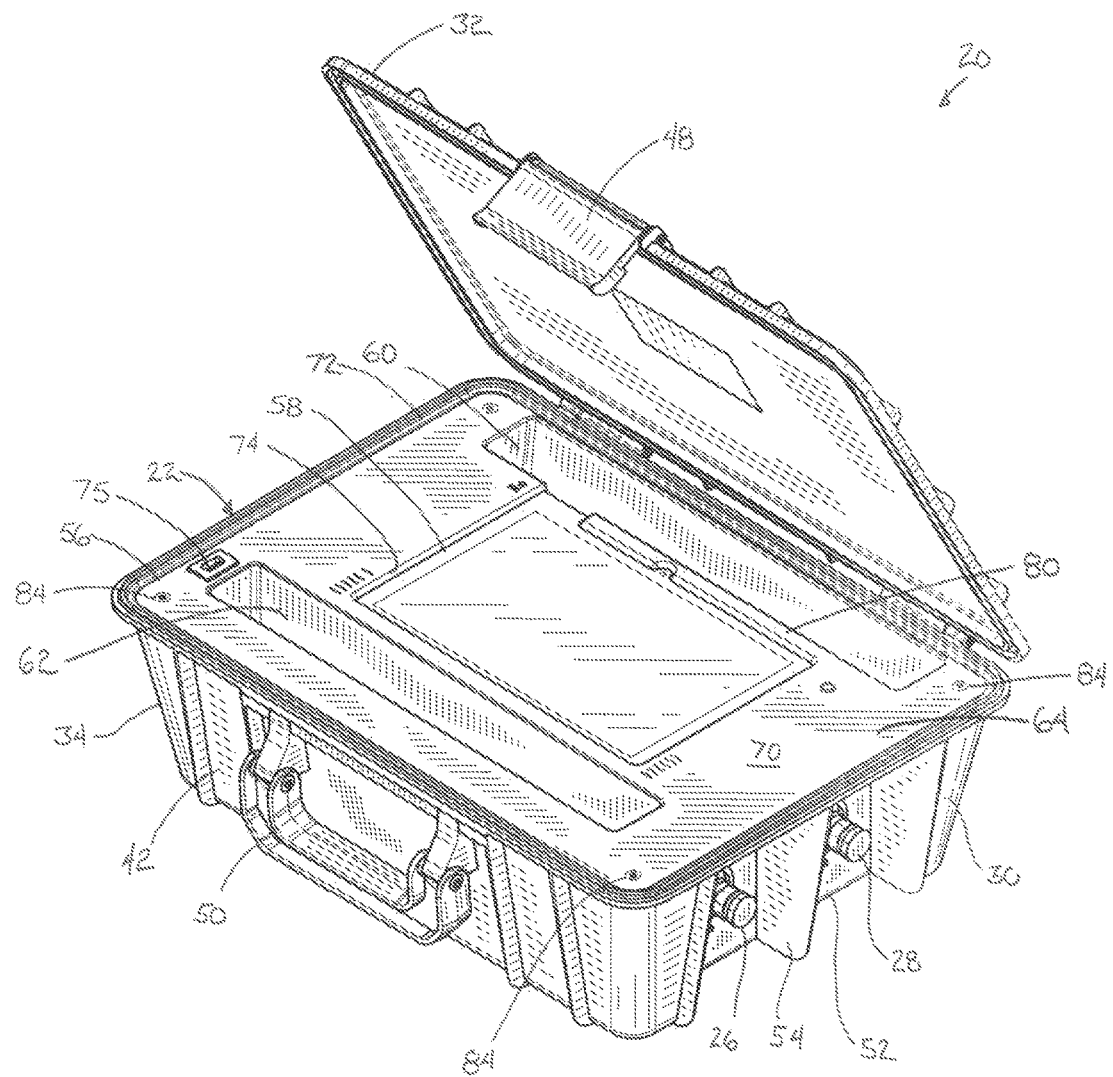
FIG. 5 is a front side isometric view of the device of FIG. 1 with the lid in a partially open orientation.
Figure 6:
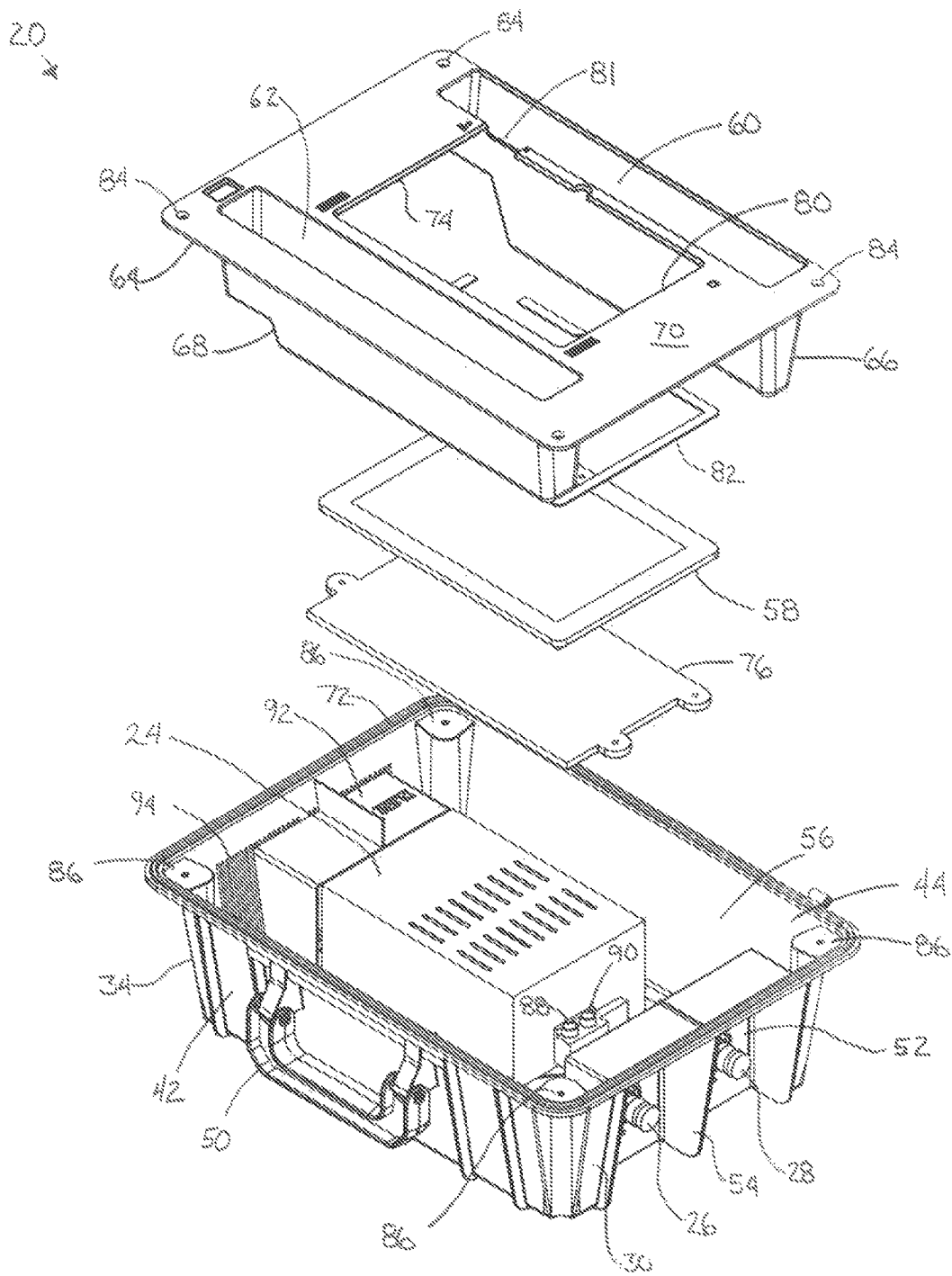
FIG. 6 is a front side exploded isometric view of the device of FIG. 1 shown with the lid removed and disclosing internal components of the device.
Figure 7:
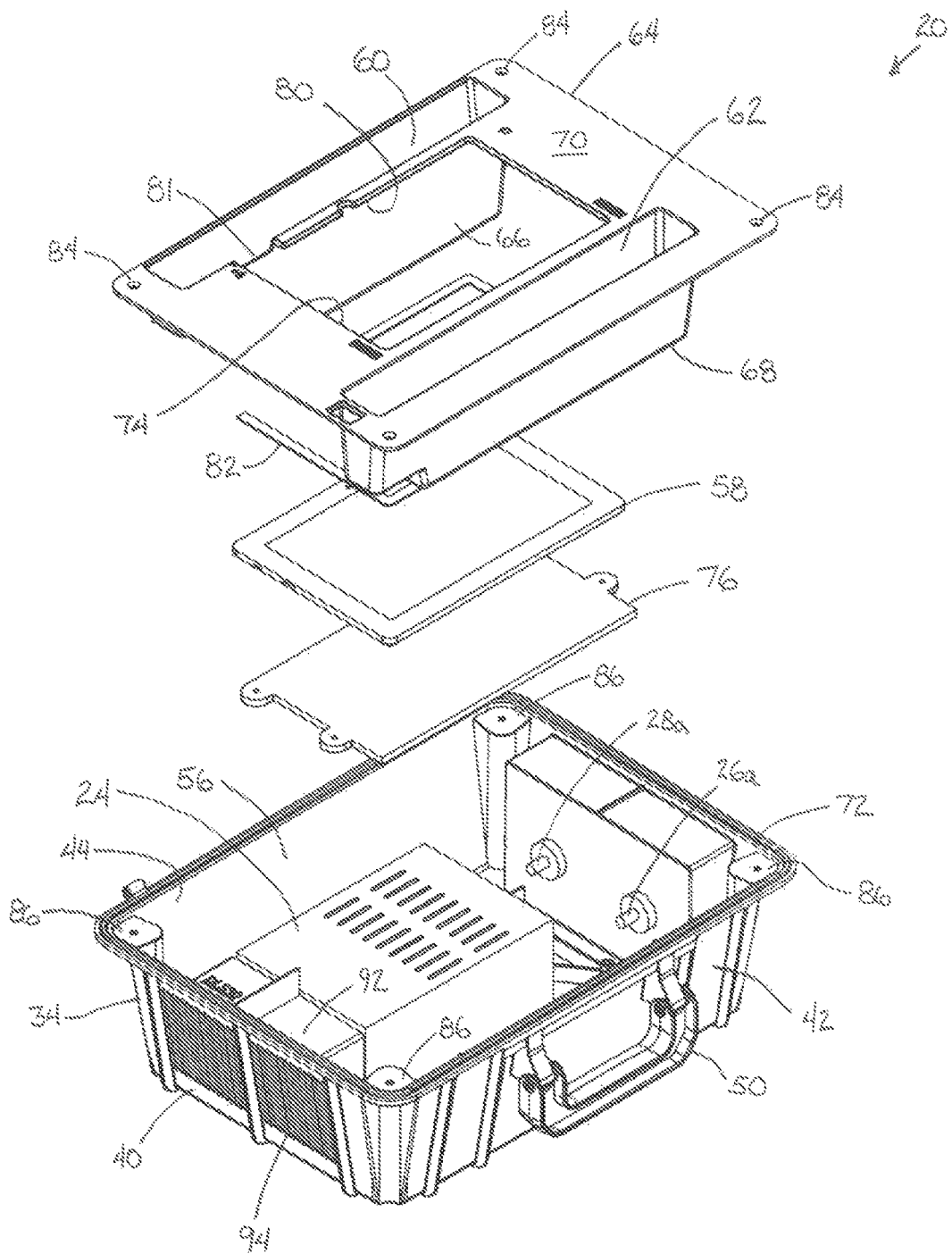
FIG. 7 is a front side exploded isometric view of the device shown from the opposite side relative to FIG. 6.

The present invention will now be described with reference to the accompanying figures, wherein the numbered elements in the following written description correspond to like-numbered elements in the figures. An embodiment of a vehicle reprogramming device 20 in accordance with the present invention is shown in FIGS. 1-5, with device 20 including a case or container or housing 22 that includes, as discussed in more detail below, computer hardware and software utilized in reprogramming computer control modules of ECUs 21 of vehicle 23 (FIG. 1A). Device 20 additionally includes an internal or integrated power supply comprising a battery charger 24 (FIG. 6), with device 20 including posts 26, 28 that in the illustrated embodiment extend out from a side or sidewall 30 of container 22 to be exteriorly exposed and accessible. Cables, such as a pair of battery cables 27a, 27b (FIG. 1A) with end clamps (not shown), may be connected at one end to posts 26, 28 and to the terminals of a vehicle battery 29 (FIG. 1A) at their opposite ends, with battery charger 24 thus operating to provide sufficient power to the vehicle battery 29, and thereby the ECUs 21 of a vehicle that is being reprogrammed using device 20.

With initial reference to FIGS. 1-5, container 22 of device 20 is shown to comprise a lid 32 connected to base 34 by hinges 36. Base 34, in turn, includes the noted right side or sidewall 30, a left side or sidewall 40, a front or front wall 42, rear or rear wall 44, and a bottom 46, with the sidewalls 30, 40, 42 and 44 thus defining an opening that is selectively coverable by lid 32. Device 20 is portable and thus sized for being readily transported by hand. Accordingly, a clasp 48 is configured to selectively secure lid 32 to base 34, with a handle 50 provided for convenient carrying of device 20. Exterior ribs are disposed about the outside of lid 32 and base 34 for structural support, with feet 38 located on bottom 46.

Referring to FIGS. 1, 2, 4-6 and 8, sidewall 30 includes a recess 52, where recess 52 is setback within sidewall 30 relative to front 42, rear 44 and lid 32, with posts 26, 28 projecting into recess 52. That is, recess 52 is partially defined by front and rear sidewalls 42, 44 and lid 32. In the illustrated embodiment, posts 26, 28 do not project beyond the perimeter defined by front 42 and rear 44 sidewalls, and lid 32 whereby posts 26, 28 are protected from being hit against objects. In the illustrated embodiment, a dividing rib 54 is provided between posts 26, 28, which effectively separates recess 52 into two halves, with rib 54 also inhibiting clamps of battery cables clamped to posts 26, 28 from contacting one another.

Referring now to FIGS. 5-8, container 22 defines an internal compartment or cavity 56 which houses various equipment, components, hardware and software utilized for reprogramming. In addition to battery charger 24, compartment 56 includes a computing device or computer that in the illustrated embodiment comprises a tablet computer 58 having a touchscreen display with keyboard functionality. Also included are a pair of receptacles 60, 62, with receptacle 60 providing storage and connectivity for a power cord 61 (FIG. 1A) and receptacle 62 providing storage and connectivity for a vehicle interface cord 63 (FIG. 1A). As understood from FIGS. 5-8, in the illustrated embodiment an insert 64 is provided, where insert 64 is constructed of a molded plastic and includes receptacles 60, 62 formed therein, with receptacles 60, 62 in turn forming legs 66, 68 that support insert 64 on the bottom 46 of container 22 with surface 70 of insert 64 being approximately level with an upper perimeter or edge 72 of base 34. An aperture or opening 74 is provided in surface 70 with computer 58 being disposed at aperture 74 whereby the display of tablet 58 is viewable and accessible when lid 32 is opened. Computer 58 is held secured to insert 64 by way of a mounting plate 76 that is used to attach computer 58 via fasteners (not shown) against a lip 80 disposed about aperture 74. A seal or frame 82 may additionally be disposed between computer 58 and lip 80. Mounting plate 76 may comprise a heatsink by being constructed of a thermally conductive material, such as a metallic material. A gap or opening 81 is provided at lip 80 to provide access to one or more ports of computer 58, such as a USB port on computer 58 that may be used to download programs to computer 58, or for a wired Internet access connection. An additional port 75 is provided on surface 70 of insert 64 for providing a connection to controller 100, discussed below.

Insert 64 additionally includes mounting holes 84 through surface 70 for securing insert 64 to mounting supports 86 that are located within the internal compartment 56 of base 34. Legs 66, 68 of insert 64 straddle battery charger 24, with battery charger 24 including a pair of connectors 88, 90 for separate wires 31a, 31b (FIG. 1A) that lead to internal posts 26a, 28a of posts 26, 28. A fan 92 is provided with base 34 including multiple apertures or vents 94 on side 40 to discharge heat from battery charger 24.

Figure 8:
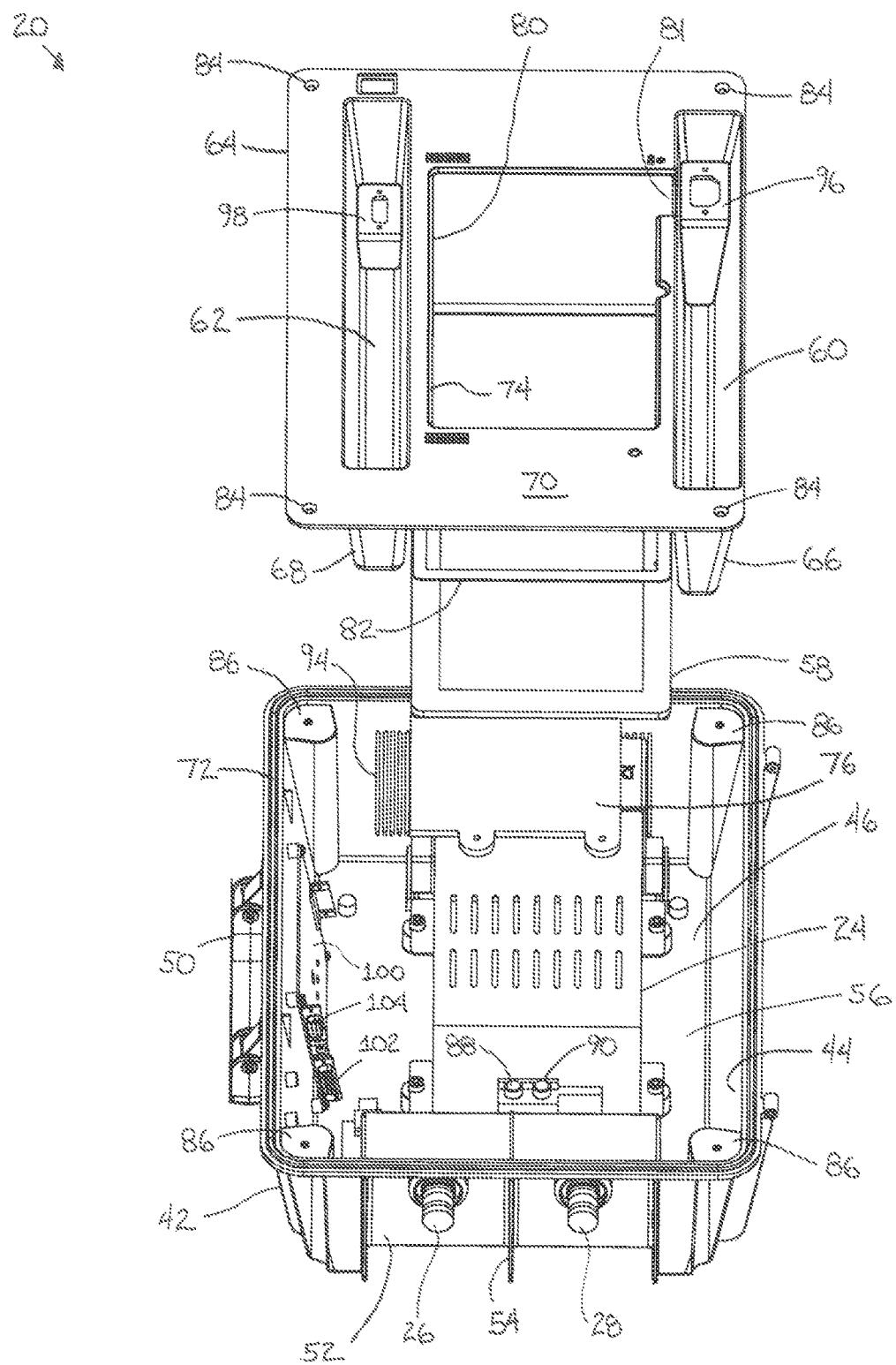
FIG. 8 is an exploded side isometric view of the device of FIG. 1 shown with the lid removed.

As shown in FIG. 8, receptacle 60 includes an internal power cord or cable mount 96 where an internal power cable 61a (FIG. 1A) that would be covered by insert 64 extends between the power supply of battery charger 24 to the cable mount 96. In particular, cable mount 96 includes an aperture for exposing pins of a connector, as well as apertures for securing the connector to the cable mount 96, with the connector of the internal power cable being disposed within a cavity formed by the cable mount 96. The separate power cord 61 that is storable within receptacle 60 is then plugged into the internal power cable at cable mount 96. The power cord 61 may then be plugged into a conventional wall outlet to provide 120V AC power to battery charger 24.

Receptacle 62 likewise includes an internal cable mount 98 where an internal cable 63a (FIG. 1A) that would also be covered by insert 64 extends between an internal controller or circuit board 100 to the cable mount 98. Cable mount 98 includes an aperture for exposing pins of a connector, as well as apertures for securing the connector to the cable mount 98, with the connector of the internal cable being disposed within a cavity formed by the cable mount 98. In the illustrated embodiment, the internal cable extending between controller 100 and mount 98 includes 16-pin connectors, with one connector end being located at mount 98 and the other plugging into port 102 of controller 100. The separate vehicle interface cord 63 that is storable within receptacle 62 is then plugged into the 16-pin connector at mount 98, with the opposite end of the vehicle interface cord configured to connect with the OBD output port 99 (FIG. 1A) of vehicle 23, such as via an SAE J1962 connector. It should be appreciated that power supplied via the power cord 61 retained within receptacle 60 is additionally used to supply power to controller 100 and computer 58, such as may be supplied via the power supply of battery charger 24.

Controller 100 comprises hardware and software, and is configured to operate as an SAE J2534 device or tool, such as for example an SAE J2534-1 device, with controller 100 including a USB port 104 for connecting to computer 58. Controller 100 thus operates as a bi-directional communicating pass through device for reprogramming of a vehicle in connection with computer 58, whereby controller 100 and computer 58 comprise a control 101 (FIG. 1A) of device 20. In the illustrated embodiment, controller 100 and computer 58 cooperatively operate together whereby computer 58 may thus be used to reflash ECUs of a vehicle. Controller 100 may be configured as a CARDAQ-PLUS 2 model SAE J2534 device supplied by Drew Technologies, Inc. of Ann Arbor, Mich.

Still further, controller 100 and/or computer 58 may be operably connected with battery charger 24 and include controls, such as software and/or hardware, whereby controller 100 and/or computer 58 are in turn operable to detect operation of battery charger 24. That is, for example, controller 100 and/or computer 58, may detect when current is being drawn and supplied by battery charger 24. Still further, the control of device 20, such as via either controller 100 and/or computer 58, may further prevent the reprogramming of a vehicle by device 20 unless it is detected that battery charger 24 is connected, such as connected to the battery of a vehicle that is to be reprogrammed. That is, prior to initiating or commencing the reflashing, a confirmation is required or may be performed by the control 100 that the battery charger is connected via posts 26, 28. Confirmation that the battery charger 24 is connected prior to initiating reflashing will inhibit a vehicle battery from depleting below the threshold charge or power level required for reflashing of the vehicle, and thereby inhibit the vehicle from terminating acceptance of the reprogramming commands, which could lead to damage of the vehicle ECU. Controller 100 and/or computer 58 may be powered via internal connections with power cable 61, such as via internal cable 61*a*, or may be provided power from the power supply of battery charger 24.

Device 20 may further be connectable to the Internet for reprogramming operations and/or to receive program updates, such as from OEM or aftermarket suppliers. Tablet computer 58, for example, may include wireless internet interface connectivity, such as via an integrated modem, to receive programs and/or provide information to a technician to assist in the reprogramming of a vehicle. Still further, an alternatively configured computer of device 20 may receive downloaded programs, or include a drive, such as a DVD drive, for downloading programs. Moreover, although device 20 is discussed herein in connection with reprogramming of a vehicle, it should be appreciated that device 20 may additionally be used for vehicle diagnostics, such as the reading of fault codes or other data via the OBD port of a vehicle, or maybe configured or used only for reprogramming or only for diagnostic servicing.

In a particular embodiment device 20 may be configured as a remote diagnostic system, with computer 58 being operable to enable communication via an Internet with a remote technician for performing vehicle diagnostics and/or reprogramming, such as in accordance with commonly owned U.S. patent application Ser. No. 15/446,744 for REMOTE DIAGNOSTIC SYSTEM AND METHOD, which is hereby incorporated herein by reference in its entirety. That is, computer 58 may include a remote diagnostic program that is operable via an Internet in connection with a diagnostic program on a remotely located computer to enable a remotely located technician to perform service on a vehicle, including reprogramming and diagnostic service. In such an embodiment, a local mechanic would connect device 20 to a vehicle through the vehicle interface cable retained within receptacle 62, connect device 20 to a power source via the power cord retained within receptacle 60, and connect battery cables between the terminals of the battery of the subject vehicle on which service is to be performed and posts 26, 28. The local mechanic would then connect with the remote computer via computer 28, whereby the remotely located technician may perform service work utilizing device 20 without the need for action by the local mechanic.

As noted, in the illustrated embodiment computer 58 comprises a tablet computing device. It should be appreciated, however, that alternative computing devices may be employed within the scope of the present invention, including for example devices having physical keyboards, DVD drives, and the like. The control may alternatively comprise an integrated controller and computing device in a single package. Still further, the device may include a battery charger with the control comprising a controller configured as a vehicle programming device, such as an SAE J2534 device, such as without a computing device. The control may be integrated with the battery charger as discussed above to thereby only be operable for use in reprogramming when the battery charger is detected as being connected to a battery. Still further, although vehicle reprogramming device 20 is discussed above in connection with the reflashing of vehicle control modules and is referred to herein as a "reprogramming device", it should be appreciated that device 20 may additionally be used for diagnostic operations separate from reprogramming operations, such as to read diagnostic codes of a vehicle without reprogramming, as may be done with an SAE J2534 device.

Other changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A vehicle computer service device comprising:
    a portable case defining an internal compartment;
    a battery charger retained within said compartment;
    a control retained within said compartment, said control configured to be operatively connected with a vehicle for reprogramming a computer control module of the vehicle; and
    exteriorly exposed connectors mounted to said case, wherein said connectors are operatively connected with said battery charger and configured to receive battery cables for connection with a battery of a vehicle.

2. The device of claim 1, wherein said connectors comprise a pair of posts extending from said case, and wherein said posts are operatively connected with said battery charger.

3. The device of claim 1, further including a power cord and a vehicle interface cable said vehicle interface cable configured for connection to an OBD port of a vehicle, and wherein said case includes at least one receptacle contained within said compartment, said receptacle configured to store said power cord and/or said vehicle interface cord when said power cord and/or said vehicle interface cord are not in use.

4. The device of claim 1, wherein said case includes a base and a lid, said lid being connected to said base whereby said lid is selectively openable, and wherein said base includes a bottom, a front side, a rear side, a left side, and a right side, and wherein said case includes an exterior handle.

5. The device of claim 1, wherein said control is configured to be operatively connected with an on-board diagnostics ("OBD") port of a vehicle.

6. The device of claim 5, wherein said control comprises a controller and a computer having a display with said computer being operably connected with said controller, and wherein said controller is configured to be operatively connected with the OBD port of a vehicle.

7. The device of claim 6, wherein said computer is configured to be operatively connected with an Internet.

8. The device of claim 6, wherein said case includes an insert with said computer being mounted to said insert, wherein said insert includes an aperture with said display of said computer oriented at said aperture, and wherein said insert includes an upper surface and is disposed over said battery charger whereby said battery charger is covered by said insert.

9. The device of claim 1, wherein said device is configured for use in reprogramming a computer control module of a vehicle, and wherein said control is operable to detect when said battery charger is connected to a vehicle battery.

10. The device of claim 9, wherein said device is configured to be inoperable to reprogram a computer control module of a vehicle when said control is unconnected to a vehicle battery.

11. A vehicle computer reprogramming device comprising:
    a battery charger;
    a control integrated with said battery charger, said control configured for being operatively connected with a vehicle to reprogram computer control modules of the vehicle;
    wherein said control is operable to detect when said battery charger is connected to a vehicle battery, and wherein said device is configured to be inoperable to reprogram a computer control module of a vehicle when said control is unconnected to a vehicle battery.

12. The device of claim 11, wherein said control comprises a controller configured to be operatively connected with an on-board diagnostics ("OBD") port of a vehicle for providing bi-directional communication with the vehicle.

13. The device of claim 12, wherein said control further comprises a computer having a display.

14. The device of claim 13, wherein said computer is configured to be operatively connected with an Internet.

15. The device of claim 11, further comprising a case within which said battery charger and said control are disposed, and wherein said case includes a base and a lid, said lid being selectively openable, and further including a pair of posts extending exteriorly from and mounted to said case, and wherein said posts are operatively connected with said battery charger.

16. The device of claim 15, further including a power cord and a vehicle interface cable said vehicle interface cable configured for connection to an OBD port of a vehicle, and wherein said case includes at least one receptacle contained within said compartment, said receptacle configured to store said power cord and/or said vehicle interface cord when said power cord and/or said vehicle interface cord are not in use.

17. The device of claim 15, wherein said control comprises a computer having a display and wherein said case includes an insert with said computer being mounted to said insert, and wherein said insert includes an aperture with said display of said computer oriented at said aperture.

18. The device of claim 17, wherein said insert includes an upper surface and is disposed over said battery charger whereby said battery charger is covered by said insert.

19. The device of claim 15, further including a vehicle interface cable configured for connection to an OBD port of a vehicle, and wherein said case includes a cable mount configured to receive an end of said vehicle interface cable to connect said vehicle interface cable with an internal cable from said cable mount to said control.

20. The device of claim 19, wherein said case includes an insert disposed over said battery charger, and wherein said cable mount is joined to said insert.

21. A vehicle computer service device comprising:
    a portable case defining an internal compartment;
    a battery charger retained within said compartment; and
    a control retained within said compartment, said control configured to be operatively connected with an on-board diagnostics ("OBD") port of a vehicle for communication with the vehicle to reprogram a computer control module of the vehicle, wherein said control is operable to detect when said battery charger is connected to a vehicle battery, and wherein said control is configured to be inoperable to reprogram the computer control module of the vehicle when said control is unconnected to the vehicle battery.

22. The device of claim 21, further including a pair of posts extending exteriorly from and mounted to said case, and wherein said posts are operatively connected with said battery charger, and wherein said control comprises a controller and a computer having a display with said computer being operably connected with said controller, and wherein said controller is configured to be operatively connected with the OBD port of a vehicle.

* * * * *